United States Patent
Cowelchuk et al.

(10) Patent No.: US 7,431,379 B2
(45) Date of Patent: Oct. 7, 2008

(54) METHOD OF MAKING AN INTERIOR PANEL FOR A DOOR AND AN ARTICLE MADE THEREBY

(75) Inventors: Glenn A. Cowelchuk, Chesterfield, MI (US); Robert J. Adams, Ypsilanti, MI (US); Kenneth W. Shaner, Howell, MI (US); Nelson E. Williams, Jr., Saline, MI (US); John D. Youngs, Southgate, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 11/832,670

(22) Filed: Aug. 2, 2007

(65) Prior Publication Data

US 2007/0267890 A1 Nov. 22, 2007

Related U.S. Application Data

(62) Division of application No. 10/911,121, filed on Aug. 4, 2004, now Pat. No. 7,273,572.

(51) Int. Cl.
B60J 5/00 (2006.01)
(52) U.S. Cl. .................................................. 296/146.7
(58) Field of Classification Search .............. 296/146.7, 296/39.1
See application file for complete search history.

(56) References Cited

U.S. PATENT DOCUMENTS

| | | | |
|---|---|---|---|
| 3,927,161 A | 12/1975 | Powell et al. | |
| 4,323,406 A | 4/1982 | Morello | |
| 4,810,452 A | 3/1989 | Taillefert et al. | |
| 5,082,609 A | 1/1992 | Rohrlach et al. | |
| 5,089,328 A * | 2/1992 | Doerer et al. ............ 428/308.4 |
| 5,389,317 A | 2/1995 | Grimmer | |
| 5,411,688 A | 5/1995 | Morrison et al. | |
| 5,439,630 A | 8/1995 | Gallagher et al. | |
| 5,512,233 A | 4/1996 | Gallagher et al. | |
| 5,571,355 A | 11/1996 | Kornylo | |
| 5,571,597 A | 11/1996 | Gallagher et al. | |
| 5,662,996 A | 9/1997 | Jourquin et al. | |
| 5,744,231 A | 4/1998 | Igarashi et al. | |
| 5,824,251 A | 10/1998 | Morrison et al. | |
| 5,885,662 A | 3/1999 | Gardner, Jr. | |
| 6,013,210 A | 1/2000 | Gardner, Jr. | |
| 6,017,617 A | 1/2000 | Gardner, Jr. | |
| 6,248,200 B1 | 6/2001 | Dailey et al. | |
| 6,391,232 B1 | 5/2002 | Fritsch | |
| 6,544,449 B1 | 4/2003 | Gardner, Jr. | |
| 6,616,216 B2 | 9/2003 | Furuyama et al. | |

(Continued)

FOREIGN PATENT DOCUMENTS

WO WO/94/25249 11/1994

(Continued)

*Primary Examiner*—Dennis H Pedder
(74) *Attorney, Agent, or Firm*—Brooks Kushman P.C.

(57) ABSTRACT

An interior trim panel for a vehicle door is provided according to alternative methods. The interior trim panel includes a bolster to which a polyurethane skin is molded by a spraying operation. Expanded polyurethane foam is sprayed over the polyurethane skin and a backing panel is either integrally formed or assembled to the polyurethane foam layer.

5 Claims, 3 Drawing Sheets

U.S. PATENT DOCUMENTS

| | | | |
|---|---|---|---|
| 7,033,660 B2 * | 4/2006 | Cowelchuk et al. | 428/71 |
| 2001/0001687 A1 | 5/2001 | Pokorzynski | |
| 2002/0047289 A1 | 4/2002 | Furuyama et al. | |
| 2003/0180498 A1 | 9/2003 | De Winter et al. | |

FOREIGN PATENT DOCUMENTS

| | | |
|---|---|---|
| WO | WO 98/47684 | 10/1998 |

* cited by examiner

METHOD OF MAKING AN INTERIOR PANEL FOR A DOOR AND AN ARTICLE MADE THEREBY

CROSS-REFERENCE TO RELATED APPLICATIONS

This application is a division of U.S. application Ser. No. 10/911,121 filed Aug. 4, 2004, now U.S. Pat. No. 7,273,572 issued Sep. 25, 2007.

BACKGROUND OF THE INVENTION

1. Field of the Invention

The present invention relates to an interior trim panel for a vehicle door and a method of making an interior trim panel.

2. Background Art

Vehicle designers may design the specified interior trim for vehicle doors that include trim and bolster portions and other soft padded areas. Padding is frequently specified in certain areas, such as in areas near arm rests or in areas where vehicle occupants make contact with their hands or arms. Interior trim is frequently designed with multiple appearance effects and feel by providing different areas with different trim finishes. For example an interior trim panel of a door may have wood appearance portions, cloth surfaces, leather portions, and various textile coverings.

Panel portions having different physical characteristics may require multiple assembly operations to join adjacent parts together by sealing or in conjunction with adhesives. Labor costs generally tend to increase as the number of assembly operations required to prepare an interior trim panel for a door increase. Secondary manufacturing operations require additional tooling, fixtures and labor expense.

There is a need for an interior trim panel for a door and a method of making an interior trim panel having different portions that have a combination of different surface finishes. Some surface coverings may be supported by a relatively rigid bolster panel. There is a further need to provide such a method and article in a one-piece construction that minimizes material and labor costs. It is important that a high quality interior panel be provided that reduces assembly time and the number of assembly operations required to provide the interior trim panel for a door.

The above problems and needs are addressed by applicants' invention as summarized below.

SUMMARY OF THE INVENTION

One aspect of the present invention relates to a method of making an interior trim panel for a vehicle door. The method may comprise the steps of vacuum forming a bolster and inserting the bolster into a mold. A polyurethane skin is sprayed onto the mold and over one side of the bolster to form a skin/bolster assembly. An expandable polyurethane elastomer is sprayed onto the polyurethane skin. The elastomer/skin/bolster assembly is inserted into a reaction injection mold. A glass fiber material is inserted into the reaction injection mold and polyurethane is then injected into the reaction injection mold to bond an elastomer/skin/bolster assembly and the glass fiber to form a glass fiber-reinforced layer/foam/skin/bolster assembly.

According to other aspects of the invention, the glass fiber material may be a glass fiber mat or, alternatively, a quantity of chopped glass fiber. The bolster may have a decorative element on the side opposite to the side on which the polyurethane skin is sprayed.

An alternative method of making an interior trim panel of a vehicle door may comprise forming a bolster in a vacuum forming process, inserting the bolster in a mold and spraying a urethane skin onto the mold over one side of the bolster to form a skin/bolster assembly. An expandable polyurethane elastomer layer may then be sprayed onto the polyurethane skin to form a foam/skin/bolster assembly. In the alternative method, a substrate is assembled to the elastomer layer of the foam/skin/bolster assembly.

According to other aspects of the latter alternative, the step of assembling the substrate may further comprise placing the substrate on the foam layer while the elastomer layer is curing so that the plate becomes adhered to the foam layer. Alternatively, the step of assembling the substrate may further comprise applying an adhesive between the foam layer of the foam/skin/bolster assembly and the substrate.

According to another aspect of the invention, an interior trim panel for a vehicle door is provided. The interior trim panel includes a bolster, a urethane skin layer covering one side of the bolster. A portion of the skin layer extends outwardly from the bolster. An expanded polyurethane layer is bonded to the opposite side of the urethane skin layer from the bolster and a backing layer is attached to the opposite side of the expanded polyurethane layer from the urethane skin layer.

Other aspects of the invention as it relates to an interior trim panel for a vehicle door may include providing a glass fiber-reinforced layer of relatively rigid polyurethane that is applied in a reaction injection molding operation. A cross-section of the trim panel at the bolster may comprise a multi-layered structure comprising the relatively rigid bolster panel, the urethane skin layer applied over the bolster panel, the expanded polyurethane layer, and the cover layer that is attached over the expanded polyurethane layer. A cross-section of the trim panel outboard of the bolster may comprise a multi-layered structure including the urethane skin layer, the expanded polyurethane layer, and the fiber-reinforced urethane layer that is attached to the expanded polyurethane layer. A cover layer is also attached over the fiber-reinforced urethane layer. Alternatively, the portion of the trim panel outboard of the bolster may comprise a multi-layered structure comprised of the urethane skin layer, the expanded polyurethane layer, the fiber-reinforced urethane layer bonded to the expanded polyurethane layer, and the cover layer that is attached over the fiber-reinforced urethane layer.

These and other aspects of the present invention will be better understood in view of the attached drawings and the following detailed description of the preferred embodiments.

DETAILED DESCRIPTION OF THE PREFERRED EMBODIMENTS

Figure 1:
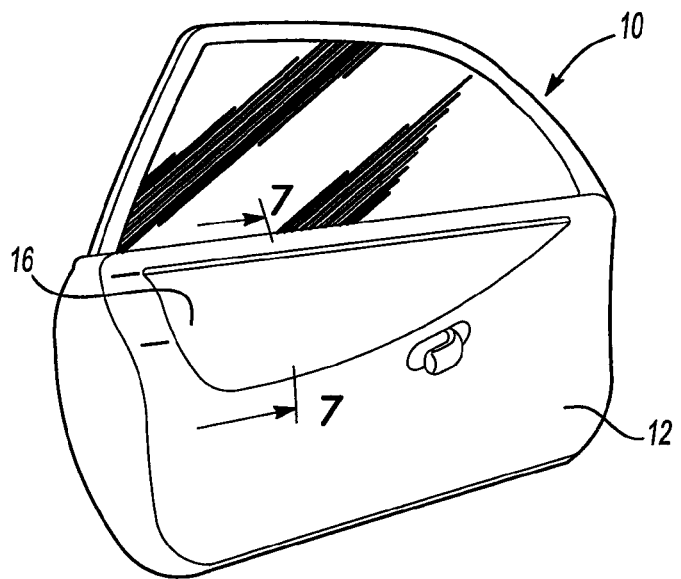
FIG. 1 is an interior perspective view of a vehicle door having an interior trim panel made according to the present invention.

Referring to FIG. 1, a vehicle door 10 is shown from the inside to illustrate the interior trim panel 12. Interior trim panel 12 includes a bolster 16 which is a pre-formed insert. The bolster 16 is a styling design element of the door that may have a different composition and surface finish than other parts of the interior trim panel 12. The bolster may be formed, for example, by a vacuum-forming process and may have a wood-like appearance, a metallic layer, or glossy finish.

Figure 2:
FIG. 2 is a cross-sectional view of a bolster panel.

Referring to FIG. 2, a bolster 16 is shown to include an edge rib 18. Edge rib 18 appears to be raised relative to the other portions of the bolster 16, but in actuality defines an indentation in the interior trim panel 12. Such indentations may be used to simulate sewing seams in interior panel designs. When the bolster 16 is attached to the interior trim panel 12, the edge rib 18 appears as a recess in the interior trim panel 12.

Figure 3:
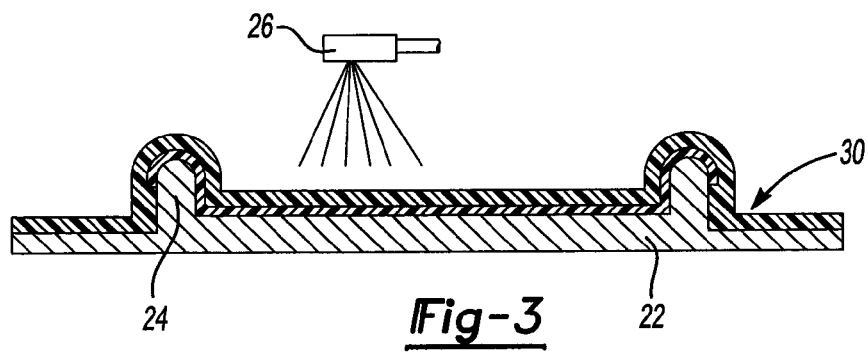
FIG. 3 is a cross-sectional view of a bolster panel in a mold on which a polyurethane skin layer is sprayed.
Figure 4:
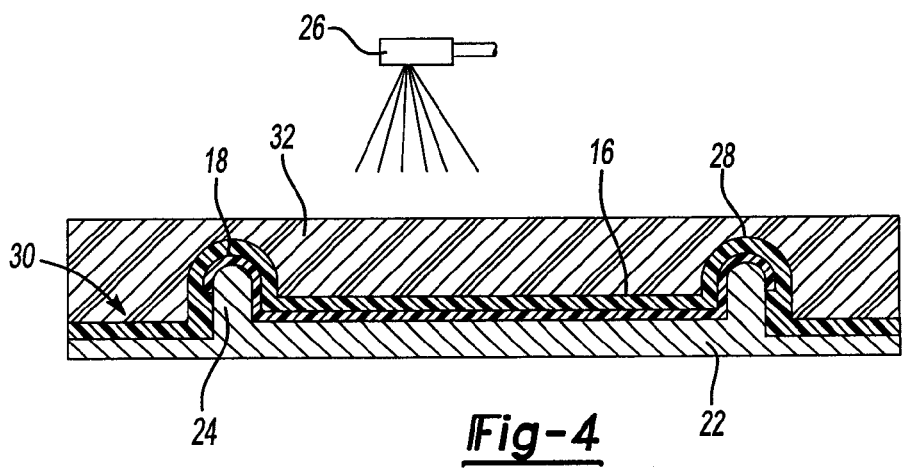
FIG. 4 is a diagrammatic cross-sectional view showing the bolster panel in a mold to which a polyurethane skin layer and an expanded polyurethane foam layer is applied.

Referring to FIGS. 3 and 4, the bolster 16 is loaded into an open mold forming tool 22 with the edge rib 18 being received onto protrusions 24 in the tool 22. A spray gun 26 sprays or otherwise dispenses a polyurethane reactant mixture to form an polyurethane skin 28 over the bolster 16 and on outboard areas 30 of the forming tool 22. This subassembly may be referred to as a skin/bolster assembly.

Referring to FIG. 4, the spray gun 26 dispenses expanded foam polyurethane 32 to form a layer of foam polyurethane on the opposite side of the skin 28 from the bolster 16. The spray gun 26 may be the same spray gun used to dispense the skin or may be an interchangeable spray head. If an interchangeable spray head is used, an articulated robot arm may be used to manipulate either spray head.

Figure 5:
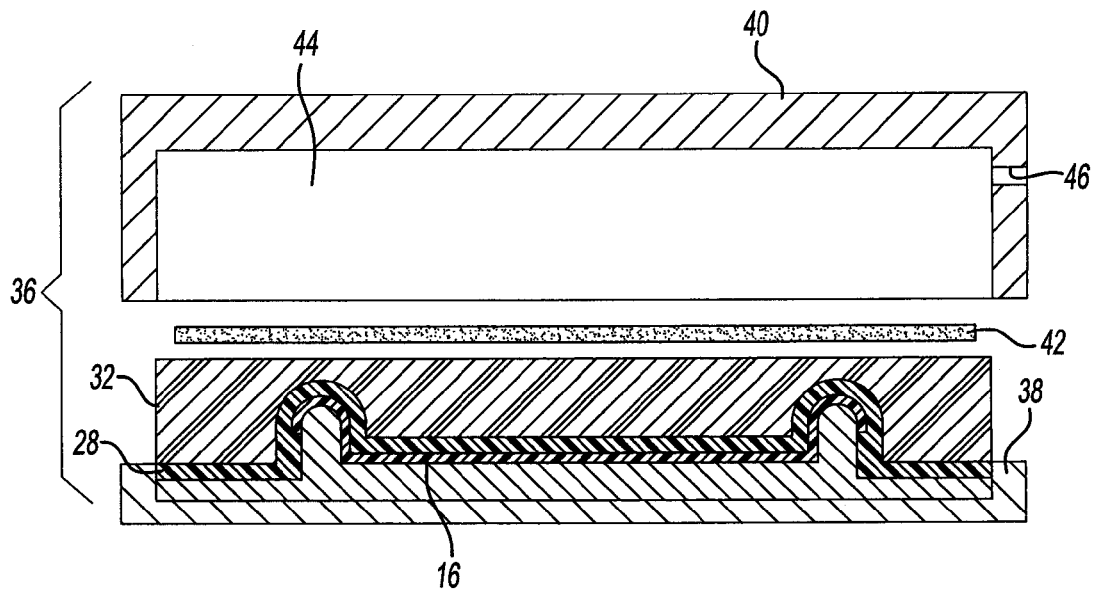
FIG. 5 is a diagrammatic cross-sectional view showing a cross-sectional view of a foam/skin/bolster assembly being placed in an open reaction injection molding die with a glass fiber reinforcement.

Referring to FIG. 5, a closed mold 36 is provided that may receive the foam/skin/bolster assembly. The foam/skin/bolster assembly must be removed from the tool 22 and loaded onto a lower mold 38 of the closed mold 36. An upper mold 40 is also provided as part of the closed mold 36. A glass fiber reinforcement 42 comprising either a glass fiber mat or chopped glass fiber is loaded into a cavity 44 defined by the upper mold 40. A port 46 is provided in the upper mold 40 for the injection of a reactant polyurethane mixture.

Figure 6:
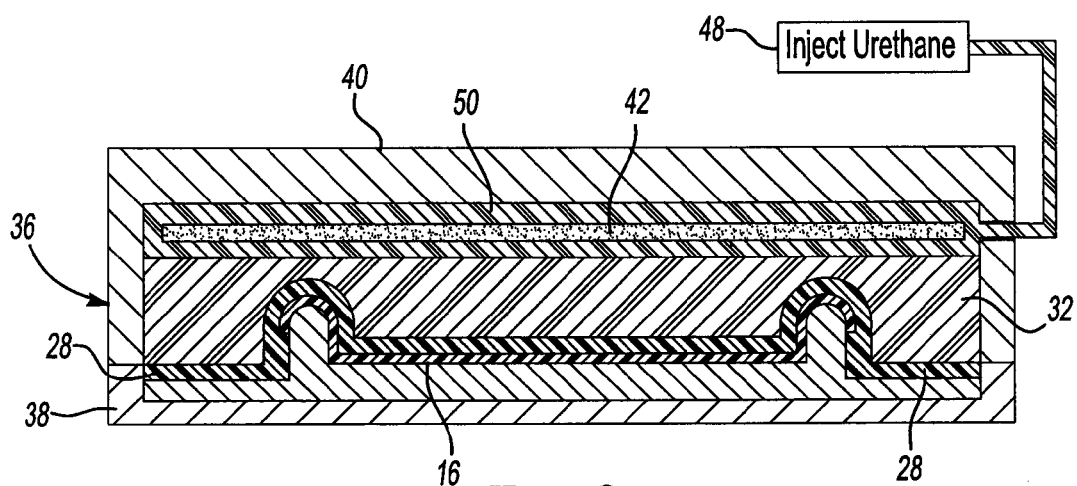
FIG. 6 is a diagrammatic cross-sectional view of the mold shown in FIG. 5 and its closed position and also illustrates the injection of urethane into a cavity containing the glass fiber reinforcement.

Referring to FIG. 6, the mold 36 is shown in its closed position with the upper mold 40 engaging the lower mold 38. A source of polyurethane 48 is provided to inject a reactant polyurethane mixture into the cavity 44. The reactant polyurethane mixture binds to the glass fiber reinforcement 42 and also adheres to the expanded foam polyurethane layer 32.

Figure 7:
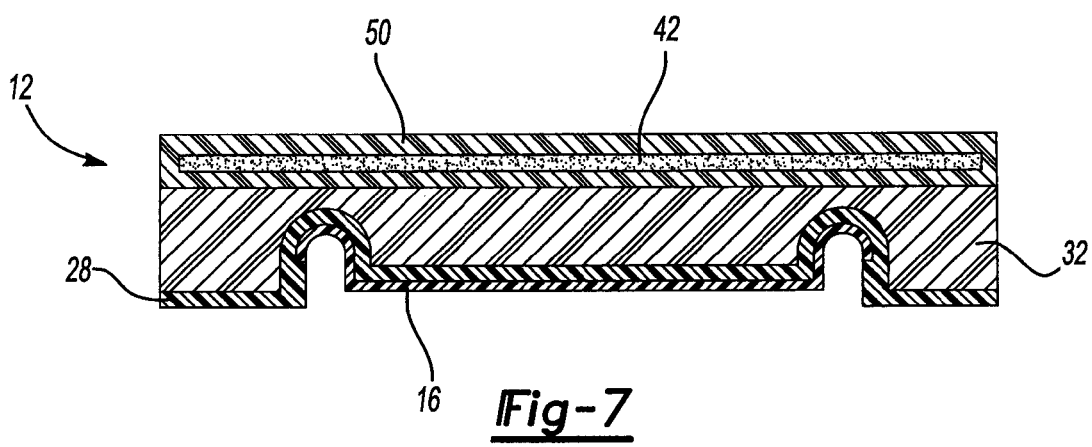
FIG. 7 is a diagrammatic cross-section view taken along the line 7-7 in FIG. 1 of an interior trim panel after completion of the molding step illustrated in FIG. 6.

Referring to FIG. 7, the completed interior trim panel 12 is shown to include a bolster 16 over which a skin layer is molded. The skin layer 28 extends outboard of the bolster 16. An expanded foam polyurethane layer 32 is bonded to the polyurethane skin 28. The glass fiber reinforced layer 50, including the glass fiber reinforcement 42, is molded over and bonded to the expanded foam polyurethane layer 32 to complete the basic structural elements of the interior trim panel 12. Other components may then be assembled to the trim panel 12.

Figure 8:
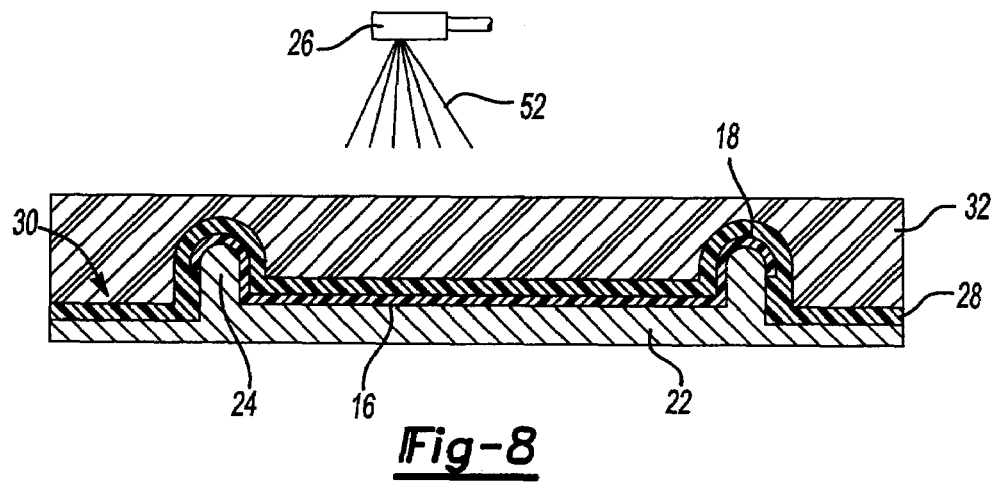
FIG. 8 is a diagrammatic cross-sectional view showing the bolster panel in a mold to which a polyurethane skin layer and an expanded polyurethane foam layer is applied.

Referring to FIG. 8, an alternative embodiment is illustrated. The steps illustrated in FIGS. 2-4 are repeated, resulting in the structure illustrated in FIG. 8. The tool 22 supporting the bolster 16 has been coated with the polyurethane skin 28 that is in turn covered by the expanded polyurethane layer 32. The spray gun 26 (or another adhesive applicator) may be used to dispense an adhesive 52 onto the expanded foam polyurethane layer 32.

Figure 9:
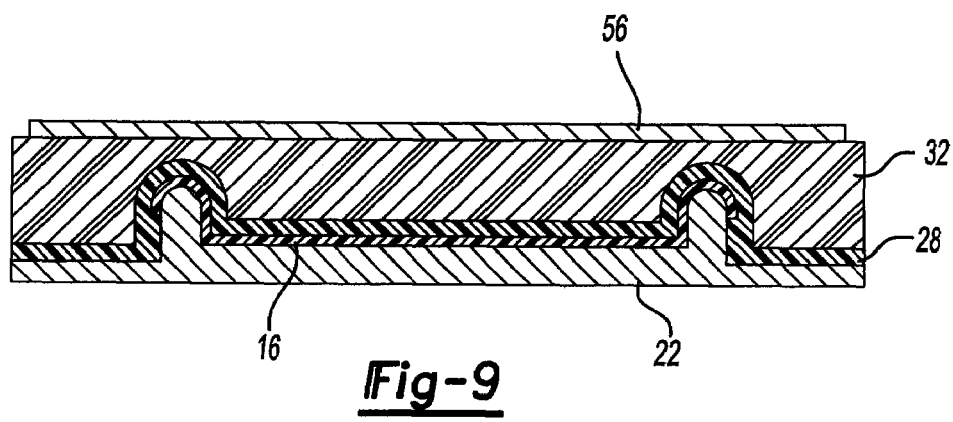
FIG. 9 is a diagrammatic cross-sectional view showing a mold in which an injection mold plate is secured to the foam/skin/bolster prior to removal from the tool.

Referring to FIG. 9, a preformed plate that may be an injection molded plate is secured to the expanded foam polyurethane layer 32 by the adhesive 52 applied in the step shown in FIG. 8. Alternatively the plate 56 could be assembled to the expanded foam polyurethane 32 without an adhesive if it is placed on the expanded foam polyurethane layer 32 before it is cured and still inherently adhesive.

Figure 10:
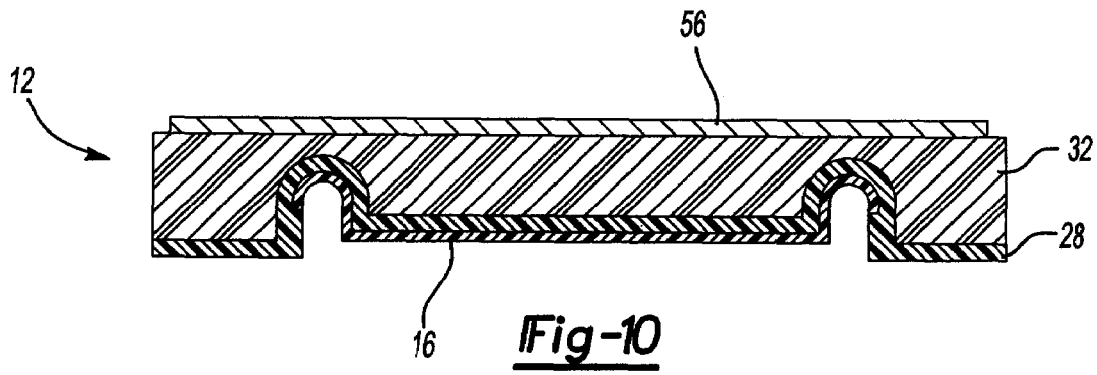
FIG. 10 is a diagrammatic cross-sectional view showing the assembled plate and foam/skin/bolster assembly.

Referring to FIG. 10, the completed interior trim panel 12 is shown to include a bolster 16 to which a polyurethane skin 28 is molded. A layer of expanded foam polyurethane 32 is applied to the polyurethane skin 28. Finally, the plate 56 is adhered by adhesive or by inherent adhesive properties to the expanded foam polyurethane layer 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An interior trim panel for a vehicle door, comprising:
   a bolster panel having a peripheral edge;
   a urethane skin layer covering one side of the bolster panel and having a portion extending outwardly from the peripheral edge of the bolster panel, wherein the portion extending outwardly from the bolster panel provides an exposed surface of the trim panel;
   an expanded polyurethane layer bonded to the opposite side of the urethane skin layer from the bolster panel; and
   a backing layer attached to the opposite side of the expanded polyurethane layer from the urethane skin layer wherein a bolster portion of the trim panel within the peripheral edge of the bolster panel is a multilayered structure comprised of the relatively rigid bolster panel, the urethane skin layer applied over the bolster panel, the expanded polyurethane layer that is sprayed over the urethane skin layer, and the backing layer that is attached over the expanded polyurethane layer and wherein the portion of the trim panel outboard of the peripheral edge of the bolster is a multilayered structure comprised of the urethane skin layer, the expanded polyurethane layer, and the fiber-reinforced urethane layer attached to the expanded polyurethane layer and the backing layer that is attached over the fiber-reinforced urethane layer.

2. An interior trim panel for a vehicle door, comprising:
   a bolster panel having a peripheral edge;
   a urethane skin layer covering one side of the bolster panel and having a portion extending outwardly from the peripheral edge of the bolster panel, wherein the portion extending outwardly from the bolster panel provides an exposed surface of the trim panel;
   an expanded polyurethane layer bonded to the opposite side of the urethane skin layer from the bolster panel; and a backing layer attached to the opposite side of the expanded polyurethane layer from the urethane skin layer wherein the portion of the trim panel outboard of the bolster is a multilayered structure comprised of the urethane skin layer, the expanded polyurethane layer, and the backing layer that further comprises a fiber-reinforced urethane layer bonded to the expanded polyurethane layer.

3. An interior trim panel for a vehicle door, comprising:

a bolster panel having a peripheral edge;

a urethane skin layer covering one side of the bolster panel and having a portion extending outwardly from the peripheral edge of the bolster panel, wherein the portion extending outwardly from the bolster panel provides an exposed surface of the trim panel;

an expanded polyurethane layer bonded to the opposite side of the urethane skin layer from the bolster panel; and a backing layer attached to the opposite side of the expanded polyurethane layer from the urethane skin layer wherein the backing layer further comprises a glass fiber-reinforced layer of relatively rigid polyurethane that is applied in a reaction injection molding operation.

4. The interior trim panel of claim 3 wherein the fiber-reinforced layer is formed of rigid glass reinforced urethane.

5. The interior trim panel of claim 3 wherein the fiber reinforced layer is an injection molded member.

* * * * *